United States Patent [19]

Studer

[11] Patent Number: 5,544,970
[45] Date of Patent: Aug. 13, 1996

[54] APPARATUS FOR THE ATTACHMENT OF AN AXLE

[75] Inventor: Werner Studer, Oberageri, Switzerland

[73] Assignee: Landis & Gyr Technology Innovation AG, Zug, Switzerland

[21] Appl. No.: 431,926

[22] Filed: Apr. 28, 1995

[30] Foreign Application Priority Data

May 6, 1994 [CH] Switzerland .................. 01426/94

[51] Int. Cl.⁶ ...................................... F16B 9/02
[52] U.S. Cl. .................. 403/399; 403/400; 403/DIG. 9; 403/384; 403/235; 403/47; 403/43; 74/424.8 B
[58] Field of Search .................. 403/DIG. 9, 400, 403/399, 398, 384, 395, 236, 235, 233, 47, 48, 44, 43; 74/424.8 B; 24/135 N, 135 R

[56] References Cited

U.S. PATENT DOCUMENTS 1,981,685 11/1934 Blackburn et al. ............... 403/233 X
2,444,666 7/1948 Orain ................................ 403/47
4,354,399 10/1982 Katayama ...................... 403/47 X

*Primary Examiner*—Anthony Knight
*Attorney, Agent, or Firm*—Meltzer, Lippe, Goldstein et al.

[57] ABSTRACT

An apparatus for the attachment of an axle (10) to a hub (3) capable of rotating around a rotational axis (2) is provided with a first thread (5) and with a screw (7) with a second thread (8) and a third thread (9), so that the second thread (8) has half the pitch of the third thread (9) and is screwed into the first thread (5). A clamping device of the apparatus consists of a first part (11) and a second part (12) which is screwed via a fourth thread (13) into the third thread (9). By rotating the screw (7) the first part (11) with the screw (7) can be moved in a first direction, so that the second part (12) is at the same time moving at twice the speed in the opposite direction to the first direction. The axle (10) can be clampingly held between the first part (11) and the second part (12) in a wide diameter range so as to be centered relative to the rotational axis (2) by turning the screw (7).

5 Claims, 3 Drawing Sheets

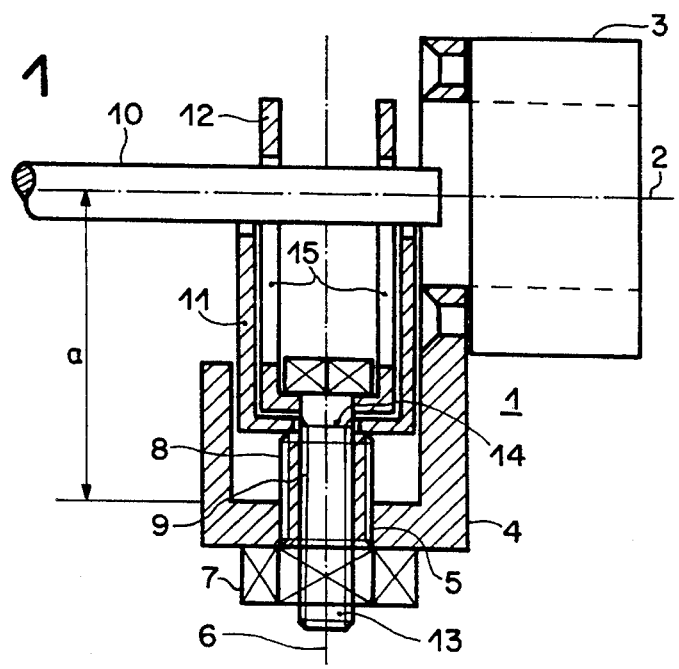
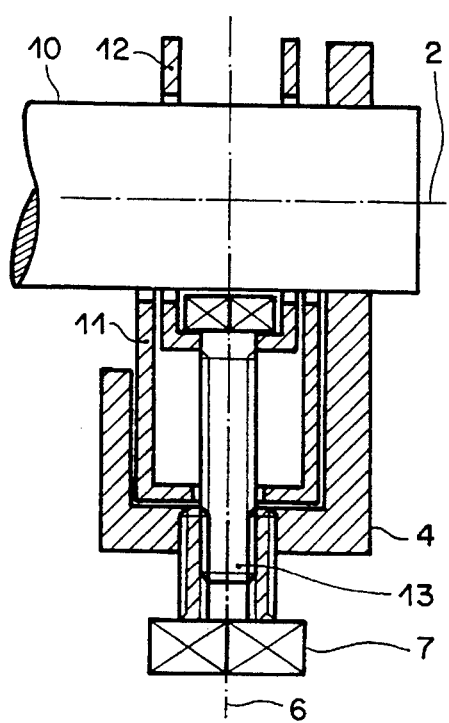
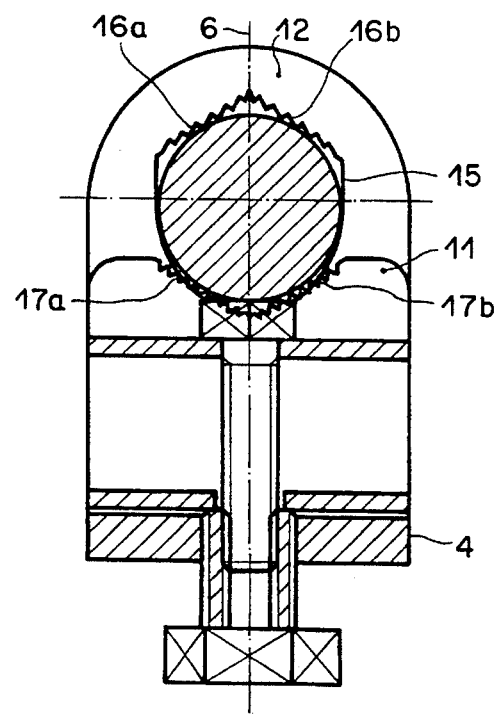

5,544,970

APPARATUS FOR THE ATTACHMENT OF AN AXLE

BACKGROUND OF THE INVENTION

The invention relates to an apparatus for the attachment of an axle, more particularly, the present invention relates to the attachment of an axle to a servo-component.

Such apparatuses are advantageously suited for the attachment of a rotatable axle of a servo-component, e.g. for the attachment of the axle of a ventilating valve to an adjusting drive of the servo-component. Apparatuses of this type are used advantageously in heating, aeration and air conditioning technology (HAA). However, an apparatus according to the invention can be used generally to attach a driven axle to an apparatus which drives the axle or also to attach a driving axle to the device driven by said axle as well in other technical fields.

An apparatus of this type is known (Landis & Gyr, VVS-Compact regulator RCE84.1, CM1-3721D, October 1993) in which an air throttle axle is attached to an air throttle adjustment drive by means of an axle attachment holder. The axle attachment holder is provided with a hoop with two threaded nuts to clampingly hold the air throttle axle and must be adapted by means of an additional special device to the diameter of the air throttle axle used so that the air throttle axle is centered with the rotational axis of the air throttle adjustment drive in order to avoid damage to the gears. The known axle attachment holder is designed for air throttle axles with a diameter in the range of 6 mm to 16 mm.

It is the object of the invention to create an easily serviced apparatus by means of which an axle can be attached to the driving device in wide range and centered relative to the rotational axis, independently of its axle diameter.

SUMMARY OF THE INVENTION

In accordance with one aspect of the present invention, there is provided an apparatus for attaching an axle to a hub which has a clamp formed by a first part and a second part that are threadably engaged to a common screw. The first part has a first thread engaged with a second thread on the screw. The second part has a fourth thread engaged with a third thread on the screw. The pitch of the third thread is twice the pitch of the second thread so that, when the screw is rotated, the first part is moved at twice the rate, in the opposite direction, of the second part. This allows the clamp formed by the first part and the second part to engage or disengage the axle without changing the axle's axis.

BRIEF DESCRIPTION OF THE DRAWINGS

Examples of embodiments of the invention are explained in further detail below on the basis of the drawing.

FIG. 1 shows an apparatus according to the invention with an axle having a relatively small diameter, FIGS. 2a and 2b show an apparatus according to the invention with an axle having a relatively large diameter.

DESCRIPTION OF THE PREFERRED EMBODIMENT

Figure 7:
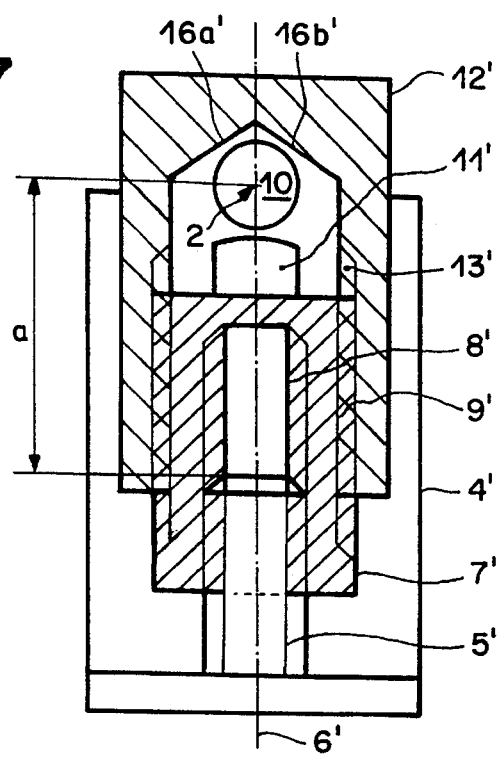
FIGS. 6a and 6b show a second part of the clamping device of the apparatus and FIG. 7 shows an additional design variant of the apparatus.

In FIG. 1, the reference number 1 designates a driving device (or rotatable element) capable of rotating around a rotational axis 2, with a hub 3 and a flange 4 in the form of a double angle. At a certain minimum distance from the rotational axis 2 the flange 4 is provided with a first thread 5 in the form of an inner thread on the center axis 6, which is not parallel to the rotational axis 2 of the driving device 1. In the preferred embodiment of the present invention, the center axis 6 and the rotational axis 2 intersect each other at right angles.

Figure 3:
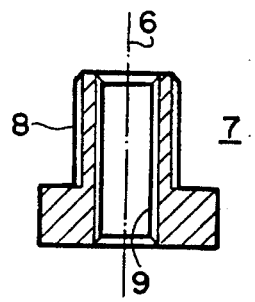
FIG. 3 shows a screw of the apparatus with an inner thread and an outer thread.

A screw 7, that is screwed thread 5, is provided with a second thread 8 in the form of an outer thread and a third thread 9 in the form of an inner thread as shown in FIG. 3. The pitch of the third thread 9 is twice the lead of the second thread 8.

The screw 7 must be adapted in a known manner in its configuration of the tool which may be used to screw the screw 7 in or out. In the example of the preferred embodiment, the screw 7 has a hexagonal head for screwing or unscrewing by means of a hexagonal wrench. In one variant, the screw 7 is made in the form of a bolt with a transversal hole for use with a swivel lever.

An axle 10 of an adjusting element (not shown in the drawing) is clampingly held between a first part 11 and a second part 12 of a clamping device as shown in FIG. 1 and FIG. 2.

The first part 11 of the clamping device is made in the form of a double angle and is placed in such manner at the front of the screw 8 that the first part 11 follows the translational movement of screw 7 on the center axis 6 as the screw 7 is turned.

As shown in FIG. 1, the second part 12 of the clamping device is also made in the form of a double angle, whereby the second part 12 comprises a fourth thread 13 in the form of an outer thread and passes through a first hole 14 drilled in the first part 11 and is screwed into the third thread 9. To pass the axle 10 through, the second part 12 is provided with a passage 15 having a width that is adapted to the maximum diameter of the axle 10 to be attached.

The two parts 11 and 12 of the clamping device are advantageously secured against rotation around the center axis 6 of the first thread 5. In the embodiment according to FIG. 1 the two parts 11 and 12 are advantageously secured against rotation in that the second part 12 is boxed in the first part 11 which is boxed in the flange 4.

The four threads 5, 8, 9 and 13 are cut in the same direction of rotation. The rotation of the screw 7 causes also a translational movement of the second part 12 which takes place against the direction of movement of the first part 11. Due to the fact that the two parts 11 and 12 can be moved in opposite directions by rotating the screw 7, the two parts 11 and 12 constitute the clamping device of the apparatus for detachable attachment of the axle 10 to the driving device 1.

The movement of the second part 12 resulting from the rotation of the screw 7, axially along the center axis 6 relative to the driving device 1 is caused by two superimposed translational movements: A first translational movement in one direction—together with the first part 11—follows a path which is determined by the pitch of the second thread 8 while a second translational movement in the opposite direction of the first direction follows a second path which is determined by the pitch of the third thread 9. Since the third thread 9 has double the pitch of the second thread 8, the second path per revolution of the screw 7 is twice as long as the first path, so that the axle 10 can be attached with the apparatus centered relative to the rotational axis 2, whereby the centering of the axle 10 is effected by means of the rotational axis 2 during attachment, automatically and without additional action. The apparatus can be adapted through simple measures to a required diameter range of axle 10 in particular through the configuration of the two parts 11 and 12 of the clamping device.

The apparatus can be designed in such manner for example, that the axle 10 with a diameter in the range from 5 mm to 20 mm can be attached to the driving device 1 so as to be centered relative to the rotational axis 2.

The apparatus with attached axle 10 is shown in FIG. 2a in elevation and in FIG. 2b in a side view. The diameter of the axle 10 is relatively large so that the axle 10 practically fills out the passage 15 (FIG. 2b).

The passage 15 and the first part 11 are advantageously provided with contact zones 16a and 16b or 17a and 7b for the axle 10 which are made in a known manner so that an optimal clamping connection can be achieved between the axle 10 and the clamping device.

Figure 4A:
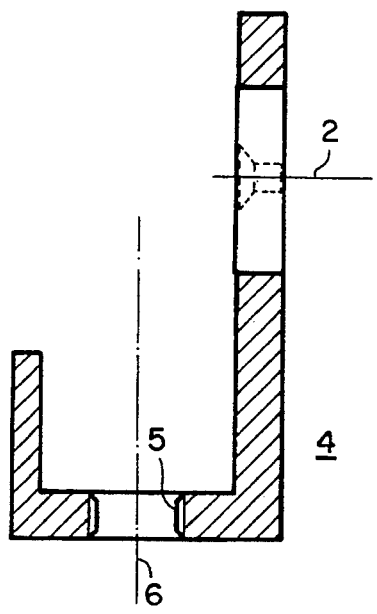
FIGS. 4a and 4b show a flange of the apparatus for the attachment of the screw to a driving device.
Figure 4B:
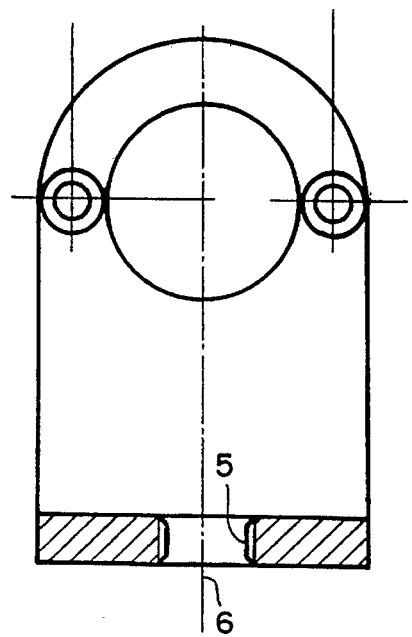
Figure 5A:
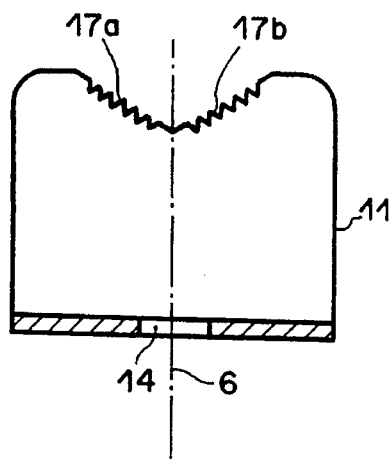
FIGS. 5a and 5b show a first part of a clamping device of the apparatus.
Figure 5B:
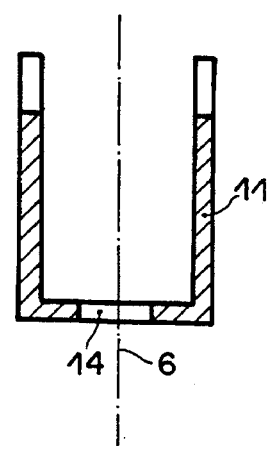
Figure 6A:
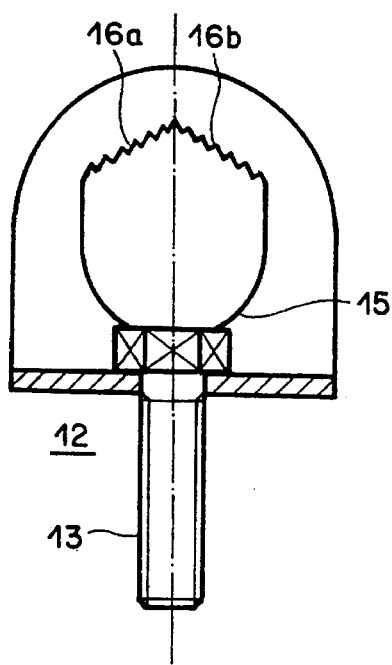
Figure 6B:
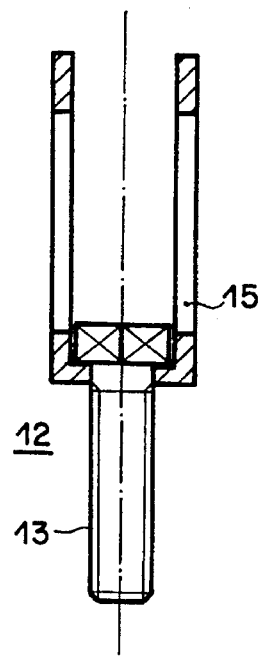

To obtain a complete representation of the advantageous embodiment of the apparatus, see FIGS. 1 and 2, the screw 7 of FIG. 3, the flange 4 in the elevation drawing of FIG. 4a or in the side view of FIG. 4b, the first part 11 in the elevation drawing of FIG. 5a or in the side view of FIG. 5b and the second part 12 are shown in the elevation drawing of FIG. 6a or in the side view of FIG. 6b.

To ensure that the axle 10 can easily be pushed into the clamping device during assembly the contact zones 16a, 16b and the contact zones 17a, 17b are advantageously spread away from each other autonomously in function of the configuration of the clamping device, this being easily achieved by means of a leaf spring which is to be inserted in the area of the hole 14 between the first part 11 and the second part 12.

In a variant embodiment of the invention shown schematically in FIG. 7, a first function element 4' corresponds functionally essentially to the flange 4 in FIG. 1, a second function element 7' to the screw 7 in FIG. 1, a third function element 11' to the first part 11 of the clamping device in FIG. 1 and a fourth function element 12' to the second part of the clamping device in FIG. 1.

The first function element 4' is provided with a first thread 5' as an outside thread. The second function element 7' is provided with a second thread 8' as an inside thread and with a third thread 9' as an outside thread, whereby the pitch of the third thread 9' is double the pitch of the second thread 8'. The third function element 11' is advantageously made in the form of a projection on the second function element 7' convex towards the axle 10. The fourth function element 12' is provided with a fourth thread 13' in the form of an inner thread with a core bore which is closed off by the contact zones 16a' and 16b' for the axle 10.

The second function element 7' is connected to the first function element 4' via the second thread 8' or the first thread 5' while the fourth function element 12' is connected via the fourth thread 13' or the third thread 9' to the second function element 7'.

The fourth function element 12' is secured against rotation around the center axis 6', e.g. by means of a guide installed on the first function element 4'.

By rotating the second function element 7' the axle 10 can be attached between the third function element 11' and the fourth function element 12'.

In summary: the apparatus is provided with the first thread 5 or 5' the center axis 6 or 6' of which is not parallel to the rotational axis 2 at a certain distance from the rotational axis 2 on the driving device 1; a displacement means in the form of a screw 7 or second function element 7' which is provided with the second thread 8 or 8' and the third thread 9 or 9' coaxial with the second thread 8 or 8', whereby the third thread 9 or 9' has double the pitch of the second thread 8 or 8' and the second thread 8 or 8' can be screwed into/on the first thread 5 or 5' by rotating the displacement means, and furthermore the clamping device has a first part 11 or a third function element 11' which can be displaced by rotating the displacement means axially with the displacement means in the center axis 6 or 6' of the first thread 5 or 5'; and the clamping device with the second part 12 or the fourth function element 12' which is provided with the fourth thread 13 or 13' into/on which the third thread 9 or 9' of the displacement means can be screwed whereby the second part 12 or the fourth function element 12' of the clamping device can be displaced in the direction opposite to the first part 11 or to the third function element 11' of the clamping device by rotating the displacement means axially on the center axis 6 or 6; of the first thread 5 or 5'.

The advantageous clamping connection of axle 10 which can be fixed or detached by rotating the displacement means is achieved, centered with the rotational axis 2 of the driving device 1.

The attachment of the axle 10, centered relative to the rotational axis 2 is advantageously achieved by rotating one single screw 7 or by rotating one single function element 7'.

I claim:

1. Apparatus for detachable attachment of an axle (10) to a device (1) capable of rotating around a rotational axis (2), comprising:

a first thread (5) whose center axis (6) is not parallel with the rotational axis (2) located at a certain distance (a) from the rotational axis (2) of the device (1), a displacement device (7) with a second thread (8), and a third thread (9) coaxial with the second thread (8), whereby the third thread (9) has twice the pitch of the second thread (8) and the second thread (8) can be screwed into the first thread (5) by rotating the displacement device (7), a first part (11) of a clamping device which can be displaced axially with the displacement device (7) in the center axis (6) by rotating the displacement device (7), a second part (12) of the clamping device provided with a fourth thread (13) into which the third thread (9) of the displacement device (7) can be screwed, whereby the second part (12) of the clamping device can be shifted in the opposite direction of the first part (11) of the clamping device by rotating the displacement device (7) axially on the center axis (6) of the first thread (5) and a clamping connection of the axle between the first part (11) and the second part (12) of the clamping device which can be fixed or detached by rotating the displacement device (7).

2. Apparatus as in claim 1, wherein the center axis (6) of the first thread (5) and the rotational axis (2) of the device (1) intersect.

3. Apparatus as in claim 1, wherein the center axis (6) of the first thread (5) and the rotational axis (2) of the device (1) intersect at a right angle.

4. Apparatus as in claim 1, wherein the first thread (5) and the third thread (9) are inside threads.

5. Apparatus as in claim 1, wherein the first thread (5) and the third thread (9) are outside threads.

* * * * *